United States Patent [19]

Stetten

[11] Patent Number: 5,550,933
[45] Date of Patent: Aug. 27, 1996

[54] QUADRATURE SHAPE DETECTION USING THE FLOW INTEGRATION TRANSFORM

[75] Inventor: George D. Stetten, Chapel Hill, N.C.

[73] Assignee: Duke University, Durham, N.C.

[21] Appl. No.: 249,342

[22] Filed: May 27, 1994

[51] Int. Cl.$^6$ ................................................ G06K 9/48
[52] U.S. Cl. ............................................................ 382/199
[58] Field of Search .................................... 382/190, 195, 382/199, 203, 209, 210, 266, 276, 278, 279, 282, 308; 364/303, 728.03, 728.28

[56] References Cited

U.S. PATENT DOCUMENTS

| | | | |
|---|---|---|---|
| 3,069,654 | 12/1962 | Hough | 382/281 |
| 4,396,903 | 8/1983 | Horbicht et al. | 382/9 |
| 4,414,685 | 11/1983 | Sternberg | 382/49 |
| 4,499,598 | 2/1985 | Chittineni | 382/54 |
| 4,545,067 | 10/1985 | Juvin et al. | 382/21 |
| 4,747,152 | 5/1988 | Knutsson et al. | 382/21 |
| 4,908,872 | 3/1990 | Toriu et al. | 382/21 |
| 4,910,786 | 3/1990 | Eichel | 382/22 |
| 5,033,099 | 7/1991 | Yamada et al. | 382/21 |
| 5,050,222 | 9/1991 | Lee | 382/21 |
| 5,068,908 | 11/1991 | Inoue et al. | 382/48 |
| 5,099,521 | 3/1992 | Kosaka | 382/6 |
| 5,115,477 | 5/1992 | Groezinger | 382/22 |
| 5,119,439 | 6/1992 | Osawa et al. | 382/22 |
| 5,161,204 | 11/1992 | Hutcheson et al. | 382/16 |
| 5,168,530 | 12/1992 | Peregrim et al. | 382/48 |
| 5,185,809 | 2/1993 | Kennedy et al. | 382/6 |
| 5,239,591 | 8/1993 | Ranganath | 382/6 |
| 5,267,328 | 11/1993 | Gouge | 382/16 |
| 5,273,040 | 12/1993 | Apicella et al. | 128/653.2 |
| 5,280,787 | 1/1994 | Wilson et al. | 128/661.1 |

OTHER PUBLICATIONS

H. C. Liu and M. D. Srinath, "Partial shape classification using contour matching in distance transformation.", *IEEE Pattern Analysis and Machine Intelligence*, vol. 12, No. 11, pp. 1072–1079, 1990.

E. Mortensen, B. Morse, W. Barrett and J. Udupa, "Adaptive boundary detection using Live–Wire two–dimensional dynamic programming.", Computers in Cardiology, Durham, North Carolina, 1992.

F. L. Bookstein, "The Measurement of Biological Shape and Shape Change", *Lecture Notes in Biomathematics*, New York, 1978, pp. 1–59.

G. H. Granlund, "Fourier Preprocessing for Hand Print Character Recognition", *IEEE Transactions on Computers*, Feb. 1972, pp. 195–201.

Copyright, George Stetten, Jul. 27, 1993, "Quadrature Shape detection, Using Path Integrated Tangents".

G. D. Stetten and R. Morris, "Quadrature Shape Detection", 2nd International Conference on Fuzzy Theory and Technology Proceedings Abstracts and Summaries, Oct. 14, 1993.

*Primary Examiner*—Joseph Mancuso
*Attorney, Agent, or Firm*—Nixon & Vanderhye

[57] ABSTRACT

A transform, the Flow Integration Transform (FIT), is applied for determining the presence of a preconceived shape in a gray scale image. The FIT represents a form of Quadrature Shape Detection. The expected contour serves as a filter for detecting potential targets as periodic signals. The FIT performs a line integral of two vectors: (1) the flow, a vector equal to the gradient of the image's intensity but rotated by 90 degrees, and (2) the local tangent to the path of integration. The path of integration follows the expected contour. The integration is performed starting at each point in the image, producing a two-dimensional transform whose pixel value corresponds to the relative presence of the contour at that location in the input image. The transform exhibits the feature that information widely dispersed in the image becomes concentrated in a local area of the transform.

26 Claims, 8 Drawing Sheets

FIG. 8A EXPECTED CONTOUR = CIRCLE

FIG. 8B EXPECTED CONTOUR = TRIANGLE

FIG. 8C EXPECTED CONTOUR = SQUARE

QUADRATURE SHAPE DETECTION USING THE FLOW INTEGRATION TRANSFORM

The U.S. Government has a paid-up license in this invention and the right in limited circumstances to require the patent owner to license others on reasonable terms as provided for by the terms of Grant No. CDR-86-22201 awarded by National Science Foundation and Grant No. NCI CA-37586 awarded by National Institutes of Health.

FIELD OF THE INVENTION

The invention is in the field of detecting the presence of contours in an image.

BACKGROUND

Processes and apparatus for extracting shapes from images for recognizing objects are used in fields such as object location by robots, recognition of internal organs in medical images and form recognition machines. In computer or machine vision processing, the images being processed are in the form of two dimensional digitized arrays of points or pixels having quantitized intensity levels.

Discontinuity in intensity levels within an image are indications of object boundaries or edges. Detecting the discontinuities in intensity provides for the edge detection of an object in the image. Localized edge detection is frequently the first step in the identification of a shape, often proceeding without a preconceived notion of the shape's pattern. Edge identification is followed by a variety of analysis procedures. The analysis is often hampered by introduction of noise and the loss of information during the edge detection step.

Some approaches to edge identification are based on interpretations of the image coordinate system as a complex plane. This allows the representation of discrete contours as complex periodic functions that lead naturally to the use of quadrature detection. These approaches have thus far been limited to parametrically defined boundaries and not pixel values in an actual image.

The general approach of breaking down the task of shape recognition into sequential pieces without feedback reflects present limitations of computer power, as well as conceptual models. By comparison, biological visual systems in primates, although divided into many levels of processing, are nonetheless integrated in a sense that information flows in both the antrograde and retrograde directions at almost every level. Studies of eye movements show, for example, a tight feedback loop involving the control of eye movements by higher visual processes during visual recognition tasks.

SUMMARY OF THE INVENTION

The invention relates to the detection of an hypothesized contour of a shape in an image. A procedure is used that merges the steps of edge detection and contour analysis into a single process, using the expected contour as a filter during initial edge detection.

The detection technique employs an image transform, specifically, a Flow Integration Transform (FIT). The FIT applied to an image detects the presence of the hypothesized contour and its location. Widely dispersed information in the image becomes concentrated in a local area of the transform. The FIT looks only at a border of a target and, therefore, requires only a one-dimensional integration with far less computation time than two-dimensional methods such as template matching. Implemented in SIMD apparatus, the computation time is proportional to the length of the path of integration, and independent of image size.

DETAILED EXPLANATION OF THE INVENTION

Initially, an hypothesized or expected shape or contour is provided. The contour may be continuous or discontinuous but does not intersect itself. It also has a predefined point called the origin. In a continuous contour, this is a point where it ends and begins. In a discontinuous contour, the origin is defined as a point on a segment of the contour. The contour is fixed in terms of rotation and scale in the image plane at its origin. Paths are created and may be viewed as replicas of the contour that are placed at the origin on a point in the image and used to detect the presence of a shape in the image. There are thus many paths in the image plane of the same form each having its location defined by the origin.

The expected shape or contour serves as a filter in that it detects an object or target approximating the expected shape. A search for the object or target in the image is made by performing a line integral of the dot product of two vectors, a flow vector and a local tangent vector.

The flow vector is a vector that has a magnitude equal to that of the gradient of the image intensity. It has a direction that is 90 degrees to that of the gradient of the image intensity. The gradient at each point in the image is a conventional vector whose x and y components are the partial derivatives of image intensity. An arbitrary but consistent choice between two possible vectors each perpendicular to the gradient is made, for example, by selecting the vector 90 degrees counterclockwise to the gradient, to thereby present iso-intensity vectors in the image.

The path corresponding to the contour being searched for is the path of integration. Local tangents to the path of integration provide the tangent vector.

For a clockwise direction of integration around the path the tangent will be colinear with flow for the case of an object or target with the expected shape being overlayed by the path. In this instance, the line integral of the dot product of the flow vector and tangent vector will have a maximum positive value.

Applying in parallel the process to all the image points or pixels provides a transform value for each point or pixel in the image. The resultant or transformed image exhibits a sharply defined fovea of maximally transformed points or pixels. This display of the fovea characteristic indicates the detection of a contour of an hypothesized shape and its location in the image.

The hypothesized shapes or contours are of varied forms. Circles, squares, triangles, as well as arbitrary contours, may be hypothesized. The paths do not have to be replicas of closed contours as they may be open or discontinuous. Moreover, multiple paths may be used such as a series of concentric circles.

Figure 1:
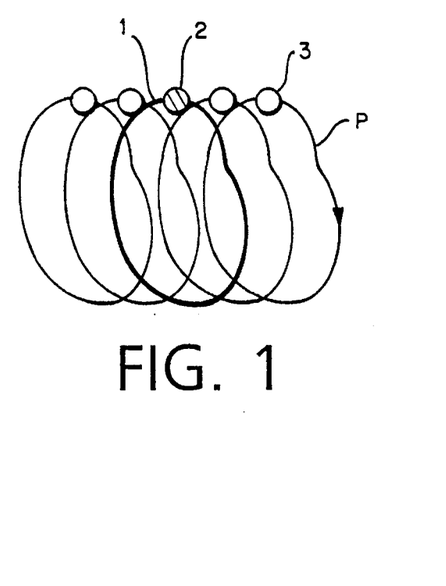
FIG. 1 illustrates a contour with a predefined origin and a plurality of paths.

In FIG. 1, the heavy line element 1 is a contour of an hypothesized or an expected shape. The origin at 2 is a point on the shape contour where the contour begins and ends. The path P which in this instance conforms to the contour of the shape is illustrated as being translated horizontally to other image points with the origin of each translated path being horizontally translated. Path P as illustrated is translated in the x direction, however, it is also to be translated in the y direction. The path is fixed in terms of rotation and scale in the image plane. There are many paths in an image due to the translation at the origin in the x and y directions. The location of a particular path is defined by its origin 3. Thus, each point in an image or pixel in a digitized image will represent the origin of a different path.

Figure 2A:
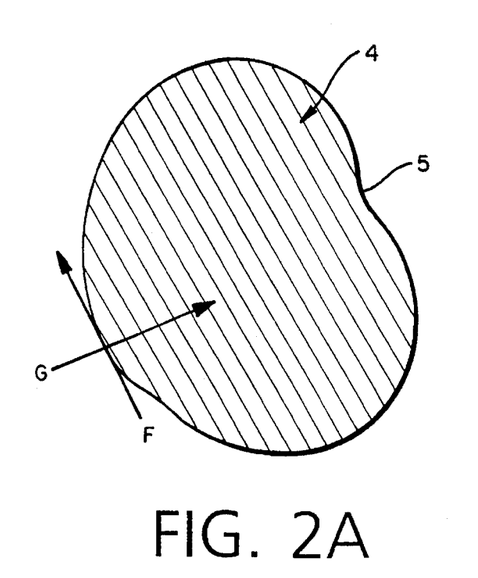
FIG. 2A shows a target or object of darker pixels in an image with gradient and flow vectors.

At each point in the image there is a vector whose x and y components are partial derivatives of image intensity. This is known as the gradient identified as G in FIG. 2A, and is determined in a conventional manner. Shown in FIG. 2A is a target or object 4 in the image. The target is a set of pixels whose values reflect an underlying object in the image. Detection of the target is a goal of the FIT. The illustrated target has a boundary 5 approximating the expected shape, and the boundary has a statistically significant transition in pixel intensity between the inside and the outside of the target. In FIG. 2A the target is comprised of darker pixels than the surrounding background pixels. The gradient in pixel intensity between the target and the surrounding background, darker pixels are assigned greater values, is perpendicular to the target boundary. Also, shown in FIG. 2A is a parameter herein called the flow. The flow F is a vector equal in magnitude to the gradient rotated 90 degrees to the gradient, in FIG. 2A, 90 degrees counterclockwise. An arbitrary but constant choice between the two possible vectors, each perpendicular to the gradient, provides iso-intensity vectors in the image.

Figure 2B:
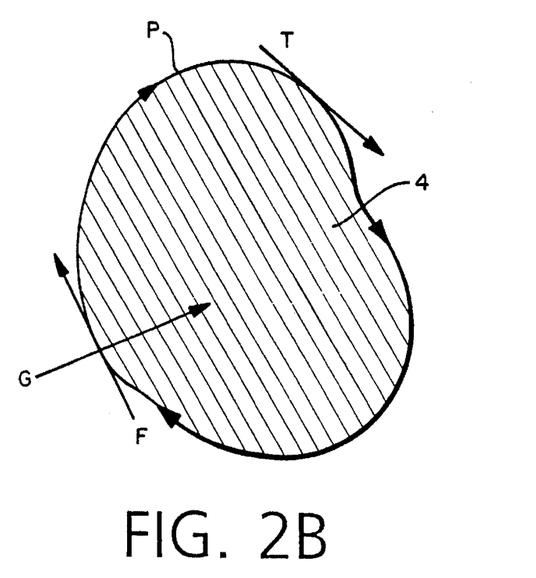
FIG. 2B shows a target with a superimposed path and a tangent vector.

FIG. 2B shows the target or the underlying object in the image with an overlying path which in this case exactly matches the target. The path does not always have to match the target exactly. Given the clockwise direction of integration shown for the path, the path tangent T will be colinear with the flow everywhere in this example, and the dot product of the tangent and the flow will have a maximum positive value. The counter-clockwise rotation of the gradient to produce the flow in combination with the clockwise direction of integration indicates which side of the path is expected to have the greater pixel value. Only the boundary of the target, and not its interior, has any effect on the resulting line integral.

The line integral of the dot product of the flow vector and the local tangent vector to the path of integration provides a Flow Integration Transform (FIT). The FIT yields a measure of the relative presence of the target. For a location (x, y) FIT can be expressed as follows:

$$FIT(x,y) = \int_{s(x,y)} (\vec{F} \cdot \vec{T}) ds \tag{1}$$

where $\vec{F}$ is the flow, $\vec{T}$ is the tangent, and s(x,y) represents the particular path achieved by fixing the origin of the contour at (x,y). Thus each pixel in the transform corresponds to a particular starting point for the line integral.

Figure 3:
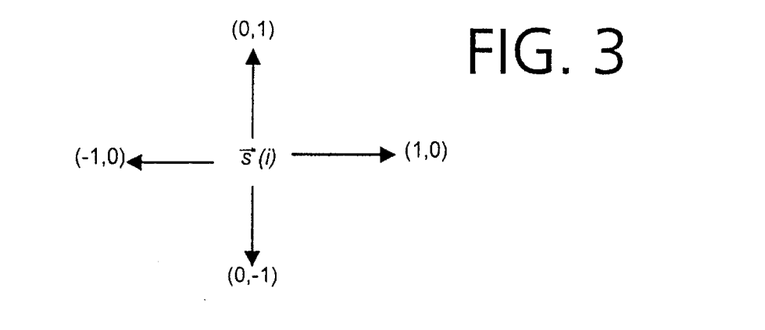
FIG. 3 is illustrative of the possible tangent vector values.

To implement the FIT on a digital computer, or in dedicated hardware, a discrete version is developed. The contour is represented as a string of n directional steps, each step $\vec{s}(i)$ moving to one of the four adjoining pixels. Thus, $\vec{s}(i)$ represents the tangent to the shape at step i of the contour. The four possible values for $\vec{s}(i)$ are shown in FIG. 3. While four pixels and four values are used to simplify the implementation and explanation, eight or more pixels and values may be used.

Starting at the origin of the contour, the net displacement after n steps from the origin is the vector $\vec{S}(n)$, expressed by equation (2) as a vectoral sum of the individual steps.

$$\vec{S}(n) = \sum_{i=1}^{n} \vec{s}(i) \tag{2}$$

$\vec{S}(n)$ can be separated into its x and y components, $S_x(i)$ and $S_y(i)$, as follows:

$$S_x(n) = \sum_{i=1}^{n} s_x(i) \text{ and } S_y(n) = \sum_{i=1}^{n} s_y(i) \tag{3}$$

The gradient of the input image at every location (x,y) in the image is a vector calculated from the pixel intensity, I(x, y), using the following expression:

$$\vec{G}(x,y) = [I(x+1,y) - I(x,y), I(x,y+1) - I(x,y)] \tag{4}$$

The flow F(x,y) at every location is simply the gradient rotated counterclockwise by 90 degrees, or:

$$\vec{F}(x,y) = \begin{bmatrix} 0 & -1 \\ 1 & 0 \end{bmatrix} \cdot \vec{G}(x,y) \tag{5}$$

The discrete version of equation (1) can be expressed as follows:

$$FIT(x,y) = \sum_{i=1}^{n} \vec{F}(x + S_x(i), y + S_y(i)) \cdot \vec{s}(i) \tag{6}$$

where the value of the FIT at each location in the x-y plane represents the application of the transform at that location. The origin of the contour is positioned at (x,y) to yield the particular path of integration used for calculating the value of the FIT at location (x,y).

Figure 4:
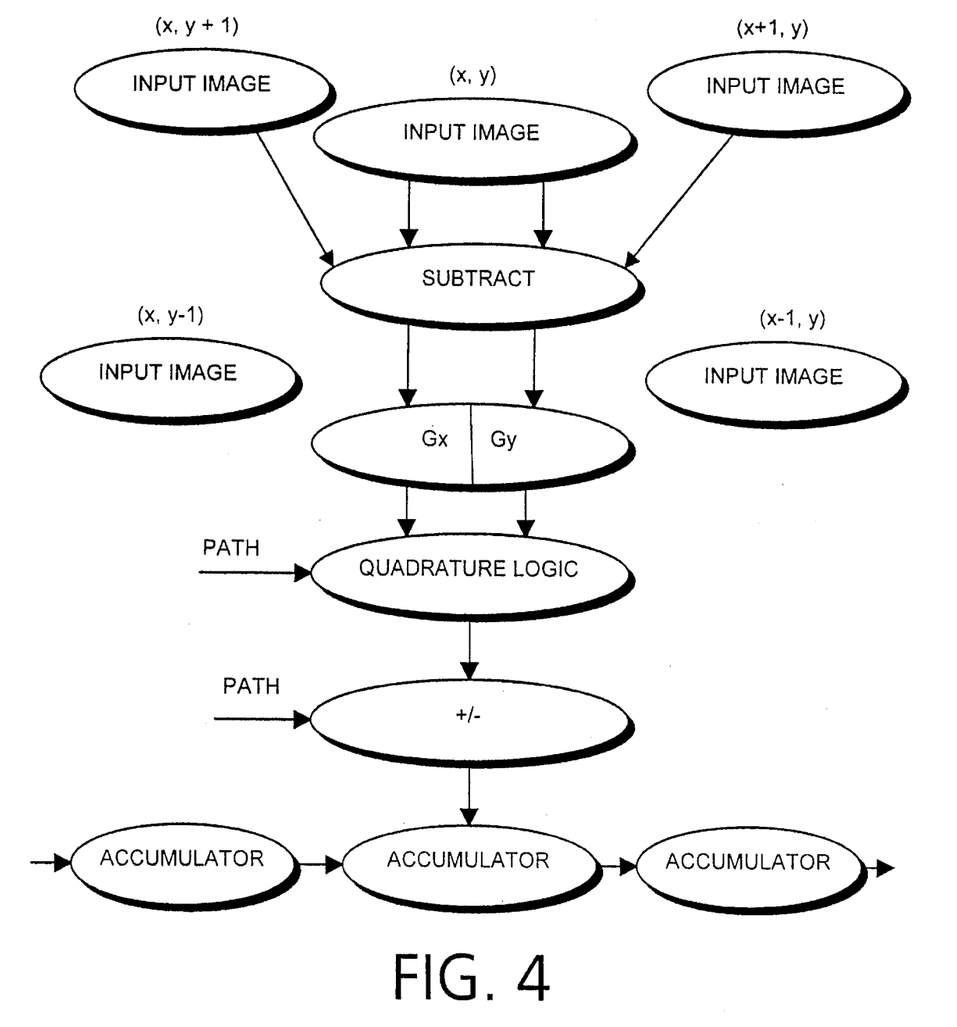
FIG. 4 illustrates the operation at the pixels around the path.
Figure 5:
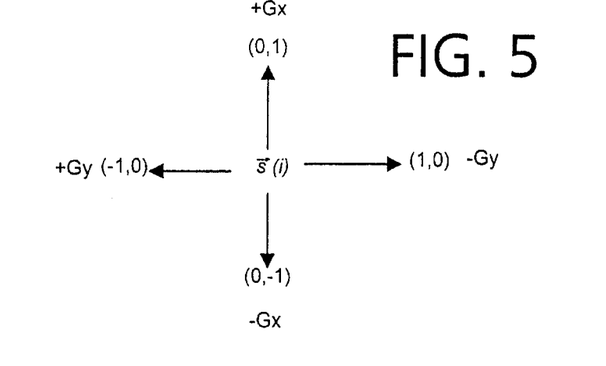
FIG. 5 illustrates the quadrature logic.

FIG. 4 shows the underlying connections between adjacent pixels and the implementation of the FIT. The pixel at a point on the path at location (x,y) is shown as a central stack of disks to which processing flows from top to bottom. The four adjacent pixels can be similarly represented. The point of view has been rotated 45 degrees. Shifting by one pixel is represented by horizontal arrows. Starting at the top, the gradient is calculated by shifting and subtracting the input image from itself in each of the x and y directions to create the two gradient component planes Gx and Gy. The calculations are made by subtracting the pixel value at (x,y) from neighboring pixels at (x+1,y) and (x,y+1), as represented by the diagonal arrows. Once calculated the gradient components are held motionless and the accumulator image is shifted from pixel to pixel around the path, while at each step Gx or Gy is added or subtracted into the accumulator depending on the direction of $\vec{s}(i)$ as indicated by the quadrature logic diagram in FIG. 5. The choice of which gradient, the horizontal (Gx) or vertical (Gy), and whether to add or subtract it depends upon the direction of the tangent $\vec{s}(i)$. For example, movement to the right shown here as $\vec{s}(i)$ is equal to (1,0) would result in subtracting the vertical gradient Gy from the accumulator. As can be further seen in FIG. 5, movement by one pixel up or down results, respectively, in adding or subtracting the horizontal gradient. While moving to the right or left results, respectively, in subtracting or adding the vertical gradient. The reason for the reversal of signs for horizontal movement is that the gradient has been rotated counterclockwise by 90 degrees to become the flow. In FIG. 5 the components of $\vec{s}(i)$ are positive in the right upper quadrant; whereas, positive flow results from rotating the gradient 90 degrees counterclockwise into the left upper quadrant. This demonstrates the quadrature characteristic of the transform.

Figure 6:
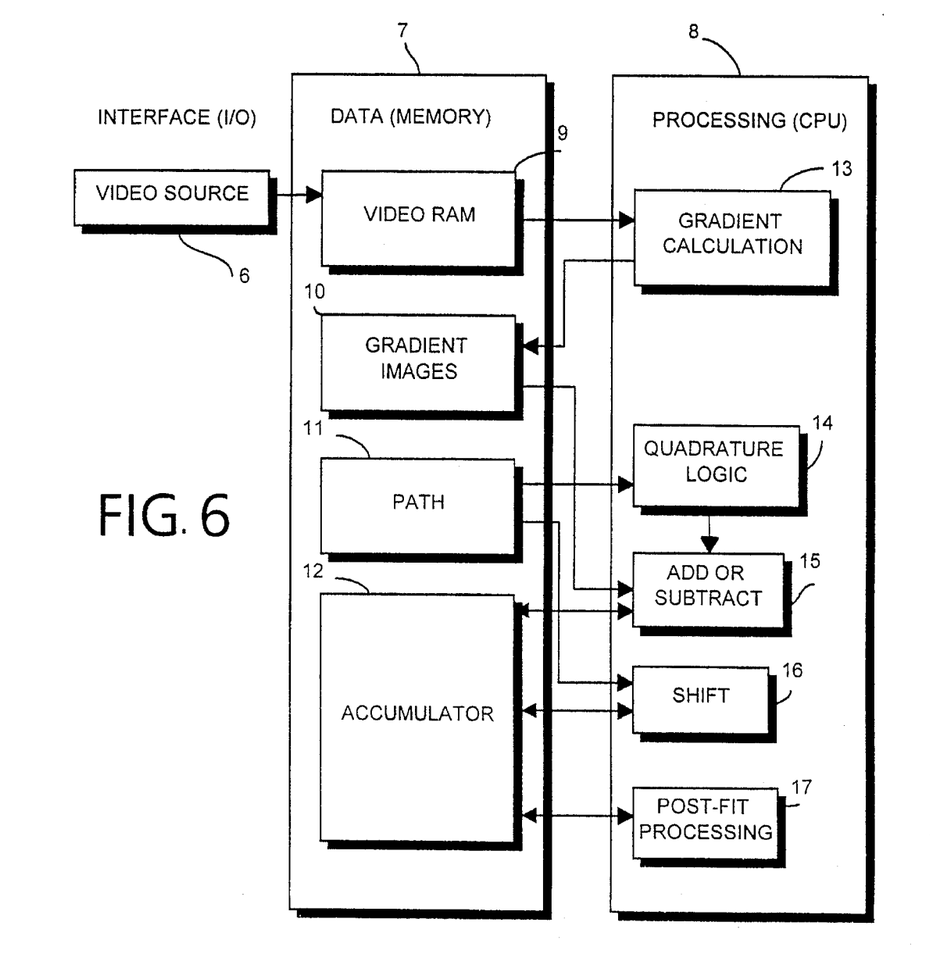
FIG. 6 is a block diagram of apparatus for processing the image.

FIG. 6 is a block diagram of an apparatus for FIT processing an image. A video source 6 provides the image to be processed to the input of the system, and more particularly to the video RAM 9 section of memory 7. The path information is also an input that is provided via the input to the video RAM in conjunction with the manipulations of a mouse and a manual tracing routine. The path is stored in section 11. The memory 7 also contains section 10 for storing calculated values of Gx and Gy and an accumulator 12 which holds the sum of the dot products. Processor 8 has routines for calculating the gradients Gx and Gy as indicated by block 13, a quadrature logic section 14 for providing in combination with Adder/Subtractor 15 the gradients Gx and Gy in accordance with the FIG. 5 instructions. A shift operation is effected by section 16 in accordance with information stored in the path section of the memory, and the dot products are accumulated in accumulator 12. Post FIT processing 17 includes filtering the transformed image.

The FIT as implemented on a Silicon Graphics Indigo Computer used the C++ ImageVision library from Silicon Graphics. Calls to the ImageVision library were Single Instruction Multiple Data (SIMD) procedures, including image-plane addition, subtraction and offset. Furthermore, offsets were restricted to one of the four neighboring pixels. No image-plane multiplication or convolution was used. The time necessary to perform the FIT in SIMD hardware is proportional to the number of steps in the path.

Although the general expressions for the FIT (equations 1 and 6) include multiplication, inherent to the dot product, the individual steps in this implementation are one pixel in distance. Therefore, only addition and subtraction are necessary since the tangent vector $\vec{s}(i)$ can only have a magnitude of 1. Moreover, the procedure never requires offsetting the accumulator image by more than one pixel, as the net displacement is accumulated one step at a time around the shape. Therefore, pixels only talk to neighboring pixels. The accumulated FIT is, in effect, moved around the path P, picking up x or y components of the flow vector from the appropriately displaced location in the image. By the end of the transform the accumulator image has returned all the way back to the origin. Thus, the path is periodic, although the integration is accomplished with a single pass. The operating image space must be larger than the input image to encompass moving the input image around the shape. The time necessary to perform the FIT in SIMD hardware is proportional to the path length.

In the present implementation of the FIT, the input image is black-and-white, consisting of 8-bit unsigned integer pixels representing gray-scale. The x and y gradient images contain 16-bit signed integers, and the FIT is collected in a single accumulator image consisting of 32-bit signed integers. To avoid roundoff errors, which are especially troublesome when summing small numbers into large ones, floating point numbers are not used anywhere.

In an illustrative example, the expected shape, or contour is entered by manually tracing the target in a clockwise direction, using Bresenham's method to interpolate between points captured as mouse input events. In a series of individual steps, each movement to each one of the four immediate neighbors is executed. To account for inaccuracies during manual tracings, the effective "Q" of the FIT filter is broadened by blurring the resulting transform. Blurring is accomplished by convolution with a circular kernel of controllable radius, containing equally weighted pixels. For display purposes (FIG. 7A), the output FIT image (signed intergers) is linearly scaled and offset to match the full dynamic range of the display, in this case, 8 bits of grayscale (black=maximum).

Figure 7:
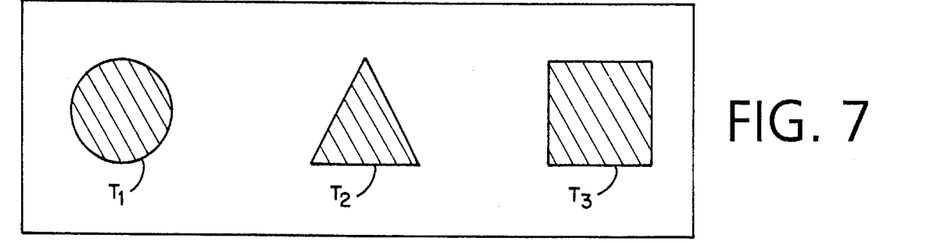
FIG. 7 shows a test image containing a circle, a triangle and a square.
Figure 7A:
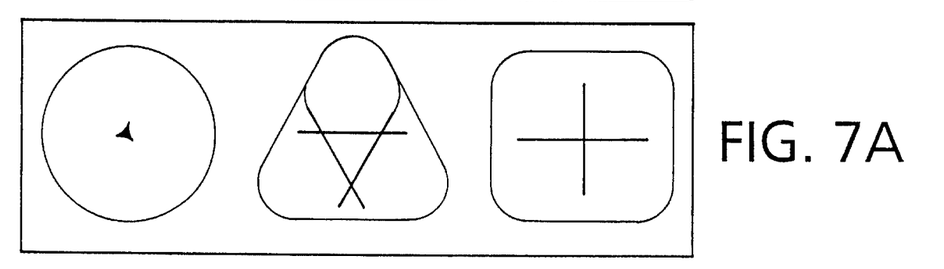
FIG. 7A shows the FIT of the test image of FIG. 7 using the expected contour of a circle. The dark locus represents the origin of path that match the target.
Figure 8A:
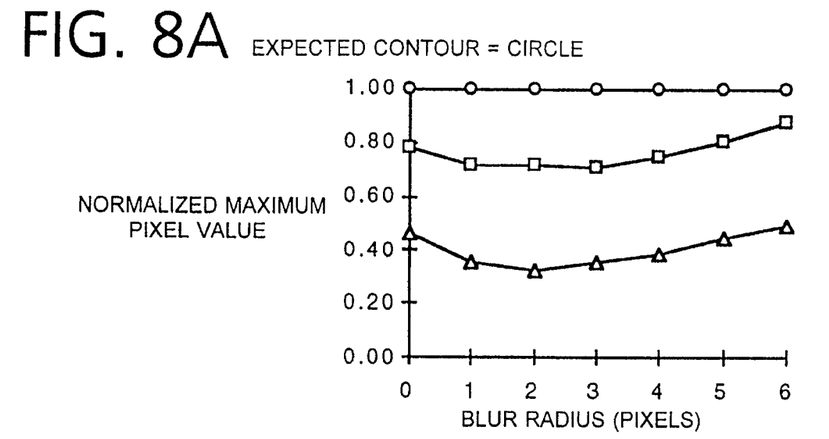
FIGS. 8A, 8B and 8C illustrate the maximum pixel values in the FIT transform for the test image of FIG. 7 using a circle, a triangle and square as the expected contour.

The FIT implementation was tested using the image shown in FIG. 7, Created by a graphics program, the test image contains three black targets on a white background: a circle $T_1$, a triangle $T_2$, and a square $T_3$. An expected contour was first obtained by manually tracing the circle. Using this expected contour, the FIT was performed on all three targets. The resulting 2-dimensional transform is shown in FIG. 7A. The transform has the same coordinate system as the original image, with the three targets, from left to right: the circle, triangle, and square. A circular smearing effect can be seen, caused by the circular path of integration. The dark locus in the center of the left-hand target, the circle, represents the cluster of origins that best fits the expected contour. Since the tracing did not exactly match the target, the transform does not show a single maximum black pixel, but rather, a dark locus. It would be expected that targets rarely match the expected contour. To accommodate this, the effective "Q" of the filter was widened by applying a blurring filter after the FIT. Maximum pixel values in the blurred transform encompass the effect of neighboring paths of integration. FIG. 8A shows the maximum pixel value resulting from the circular FIT of all three targets. Circular, square, and triangular data points identify the particular targets. Values are normalized to 1.0 and are shown for a range of blurring radii. A blur radius of zero implies no blurring of the original FIT. Since the manual tracing does not match the target exactly, the FIT spreads the optimum match into a localized cluster of dark pixels, called fovea, rather than into one very dark pixel. As can be seen, at each level of blurring, the maximum pixel intensity is greatest for the circular target, corresponding to the dark locus of points in FIG. 7A in the left-hand target, the circle. Therefore, successful discrimination of the circle was achieved.

Figure 7B:
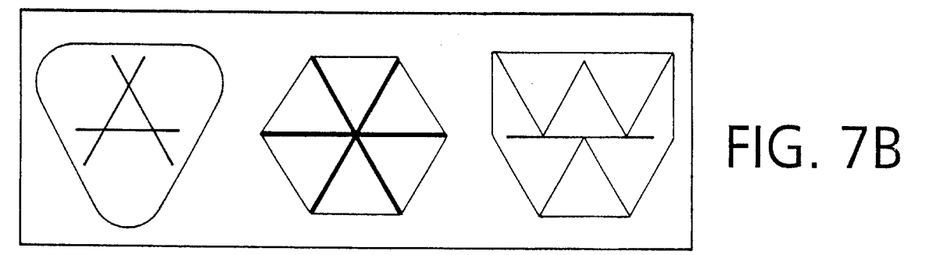
FIG. 7B shows the FIT of the test image of FIG. 7 using a triangle as the expected contour.
Figure 7C:
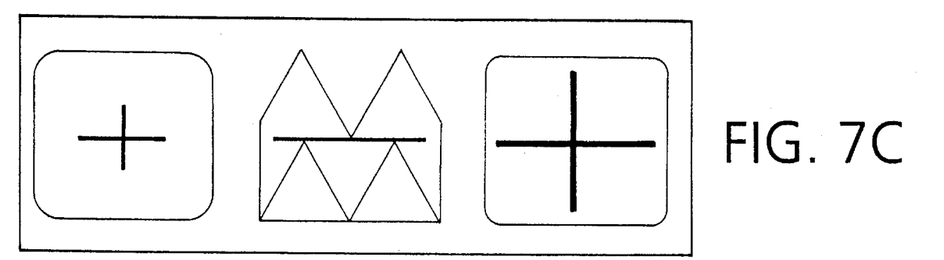
FIG. 7C shows the FIT of the test image of FIG. 7 using a square as the expected contour.
Figure 8B:
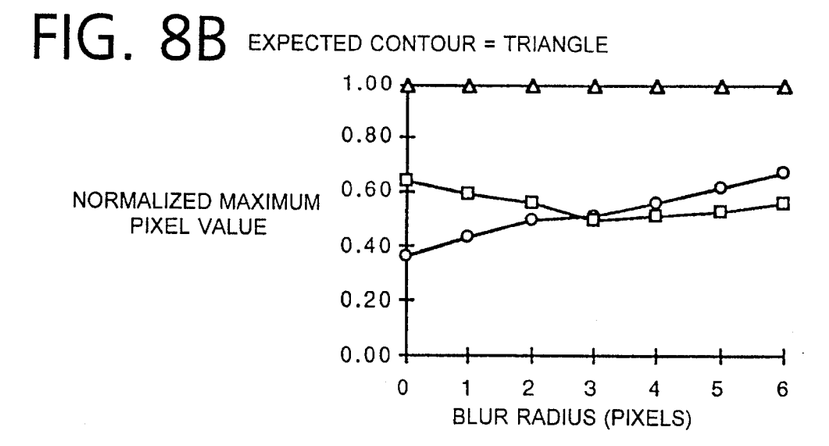
Figure 8C:
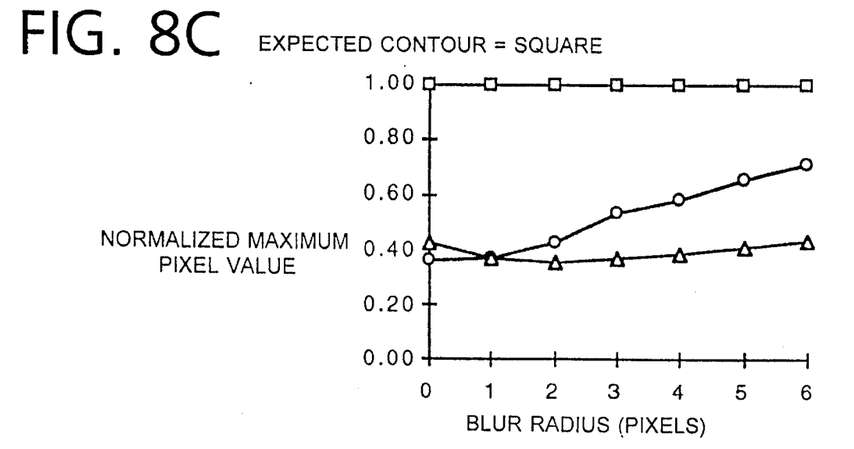
Figure 9A:
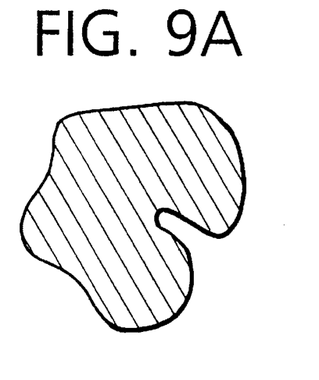
FIGS. 9A–I illustrates nine arbitrary contours of expected shapes.
Figure 9B:
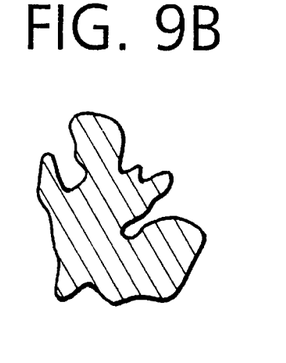
Figure 9C:
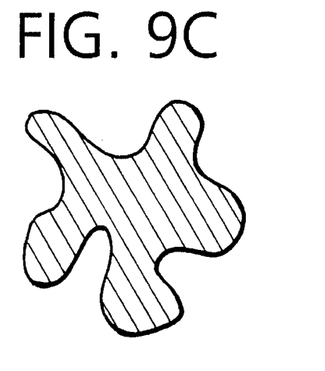
Figure 9D:
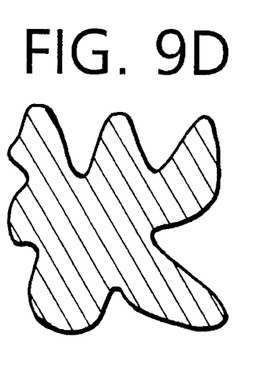
Figure 9E:
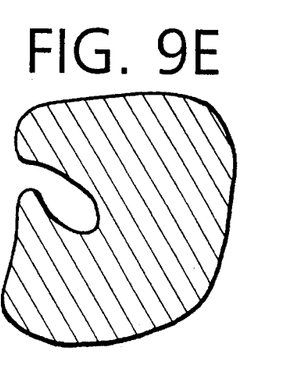
Figure 9F:
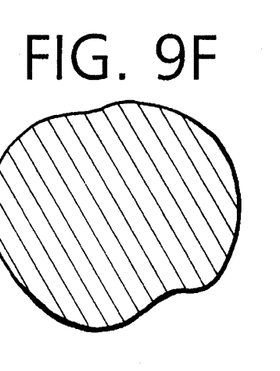
Figure 9G:
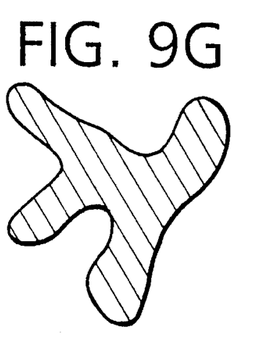
Figure 9H:
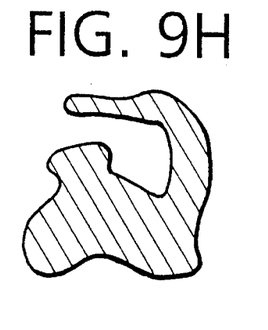
Figure 9I:
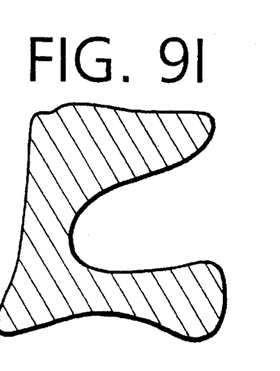

The same procedure was performed using a manual tracing of the triangle, FIGS. 7B and 8B, as well as the square, FIGS. 7C and 8C. Similar results were achieved as when using the circle, with successful discrimination of the appropriate shape in each case.

The term auto-FIT denotes the FIT of a target using a path traced around that target, which would be expected to yield a tight locus of dark pixels demonstrating a correct match. The auto-FIT yields a particular spatial pattern in the area surrounding the maximum pixel. This pattern represents partial correlations between sections of paths from other origins with sections of the target boundary. This does not represent error but is the signature of the particular auto-FIT. Thus, the auto-FIT of a circle presents a particular characteristic pattern, while that of a triangle presents a different characteristic pattern.

The term cross-FIT denotes the FIT of a target with some other path, which would be expected not to yield the single tight locus of dark pixels. However, even in a cross-FIT some areas will be darker than others, resulting from partial correlation between portions of the path of integration and edges in the image.

The locus of dark pixels in a potential auto-FIT is of particular interest in terms of ultimate shape detection, and, as indicated above, has been given the designation fovea, in tribute to the small high-resoluton portion in the center of the retina responsible for capturing the majority of visual information. Processing the fovea of a FIT is essential to discriminating between a correct match and an incorrect one. One simple method outlined above entails blurring and thresholding, although more sophisticated methods may yield greater discrimination. Of the three targets, circle, triangle and square, the auto-FIT of the square target yields the tightest locus, because the square target can be manually traced with the greatest relative accuracy.

Standard filtering techniques, for example, template matching or neural-nets can be used to detect the pattern in FIT rather than detecting the maximum pixel. This increases the sensitivity of the resulting contour detection. This differs from simple blurring used to increase the "Q" of the filter which enables detection of targets that do not match the expected shape.

Preservation of sign with the FIT is demonstrated by applying the transform to an image containing two triangles on a gray background. Two triangles identical in shape, one black and one white, are employed. Using the convention that black pixels are positive, the black triangle contains positive pixels, while the white triangle contains negative pixels with the same absolute value, relative to the gray background set to zero. Using a manual tracing of the triangle produces a transform with two clusters identical except for their sign. The white triangle transforms into a white cluster; whereas, the black triangle transforms into a black cluster. This is to be expected since the flow around the two targets is in opposite directions.

Illustrated in FIG. 9-A through 9I are nine arbitrary targets created using a standard drawing program. Hard copy of targets from a laser printer was viewed through a video camera under low light conditions to introduce noise, and captured on a Silicon Graphics computer. The noise measurements are listed at the bottom of TABLE 1. The resulting targets were traced manually producing nine expected contours, and a FIT performed on each of the 9 targets using all 9 traced paths yielding 81 different FITs. The maximum pixel value in each FIT, with a blur radius of 8 pixels, is shown in TABLE 1. Each row represents the application of a given traced path (expected contour). Each column represents a particlar target. Auto-FITs are shown in bold. Noise figures, including mean and standard deviation for both black and white areas are shown for each target image. Path length for each traced path is also shown (number of steps in the path).

Figure 10:
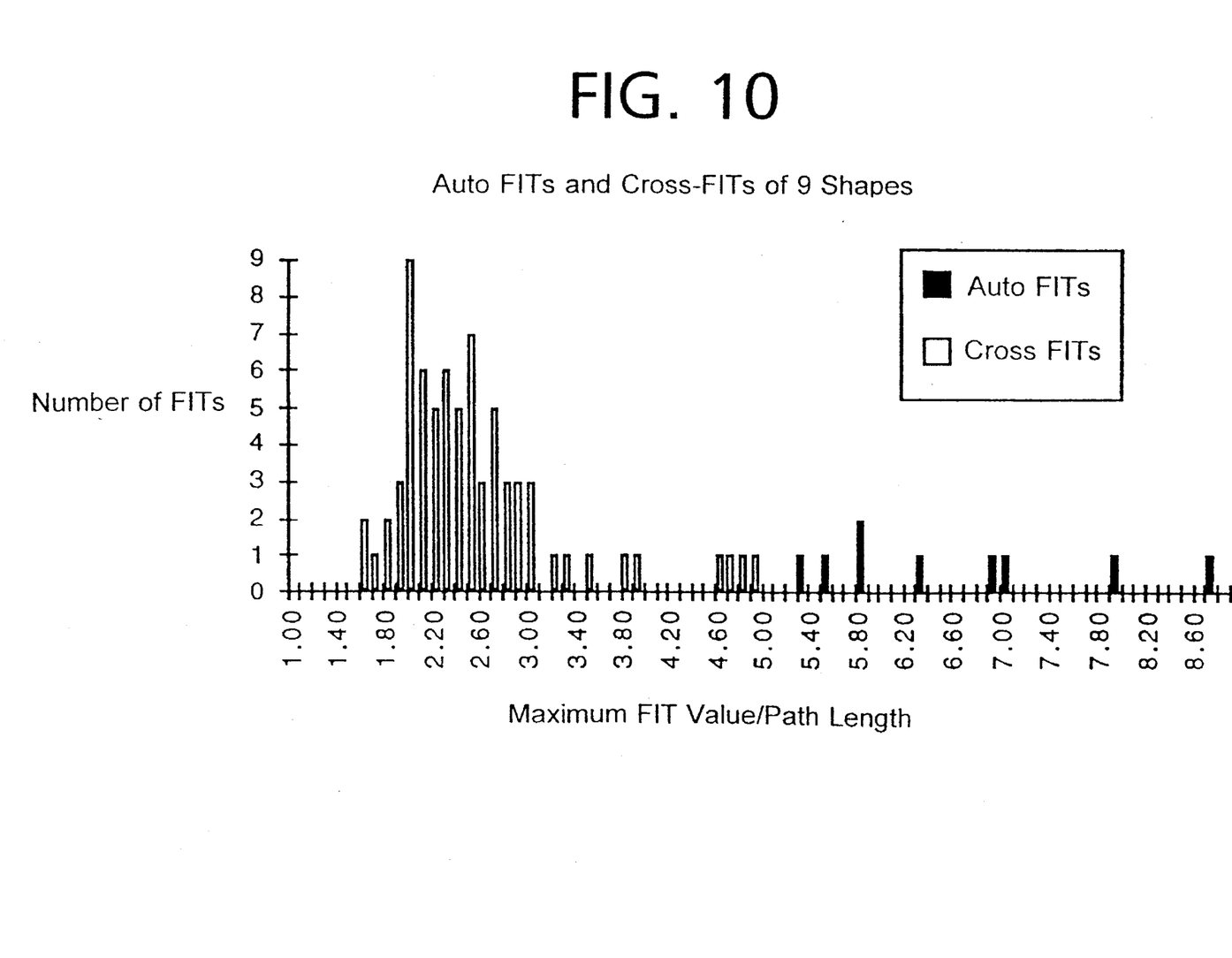
FIG. 10 is a histogram of the data of TABLE 2.

Since there is a comparing of the FITs using different traced paths with different lengths, path lengths are included on the right side of TABLE 1, it is evident that longer paths yield larger numbers simply because the path of integration is longer. To compensate for this, the data is normalized by dividing each value by path length. The normalized results for all 81 possible combinations of target and path, are shown in numerical form in TABLE 2. The same results are displayed as a histogram in FIG. 10. This demonstrates complete discrimination between matched and unmatched shapes, i.e., between auto-FITs and cross-FITs.

TABLE 1

| | MAXIMUM PIXEL VALUE FOR FIT | | | | | | | | | |
| --- | --- | --- | --- | --- | --- | --- | --- | --- | --- | --- |
| | target image | | | | | | | | | path |
| | 1 | 2 | 3 | 4 | 5 | 6 | 7 | 8 | 9 | length |
| traced path | | | | | | | | | | |
| 1 | 3396 | 1117 | 1530 | 1711 | 2779 | 2248 | 1608 | 1477 | 1615 | 580 |
| 2 | 1520 | 4184 | 1734 | 1549 | 1533 | 1671 | 1422 | 1351 | 1253 | 595 |
| 3 | 2172 | 1511 | 5805 | 1463 | 2069 | 1694 | 3387 | 1755 | 1597 | 730 |
| 4 | 1663 | 1301 | 1936 | 4248 | 2084 | 1591 | 1751 | 1504 | 1860 | 788 |
| 5 | 1867 | 1467 | 1265 | 1420 | 3834 | 2699 | 1726 | 1779 | 2200 | 687 |
| 6 | 2594 | 1334 | 1187 | 1504 | 2668 | 4696 | 1342 | 1611 | 1814 | 536 |
| 7 | 1411 | 1280 | 2167 | 1367 | 1537 | 1255 | 4097 | 1617 | 1422 | 703 |
| 8 | 1609 | 1576 | 1501 | 1628 | 2043 | 1814 | 1846 | 4232 | 1337 | 668 |
| 9 | 1701 | 1189 | 1510 | 1622 | 2542 | 1861 | 1499 | 1538 | 5059 | 725 |
| white pixel | | | | | | | | | | |
| mean | 100.2 | 115.3 | 91.64 | 92.93 | 108.1 | 96.93 | 93.57 | 111.1 | 114.9 | |
| s.d. | 32.34 | 34.82 | 31.79 | 36.21 | 36.96 | 26.82 | 20.57 | 34.06 | 26.24 | |

TABLE 1-continued

| | MAXIMUM PIXEL VALUE FOR FIT | | | | | | | | | |
|---|---|---|---|---|---|---|---|---|---|---|
| | target image | | | | | | | | | path |
| | 1 | 2 | 3 | 4 | 5 | 6 | 7 | 8 | 9 | length |
| black pixels | | | | | | | | | | |
| mean | 241.9 | 241.9 | 239.3 | 242.4 | 241.9 | 241.1 | 241.5 | 234.9 | 239.6 | |
| s.d. | 11.99 | 11.16 | 9.808 | 8.244 | 11.89 | 10.77 | 11.09 | 12.83 | 7.028 | |

TABLE 2

| | NORMALIZED MAXIMUM PIXEL VALUE FOR FIT | | | | | | | | |
|---|---|---|---|---|---|---|---|---|---|
| traced | target image | | | | | | | | |
| path | 1 | 2 | 3 | 4 | 5 | 6 | 7 | 8 | 9 |
| 1 | 5.86 | 1.93 | 2.64 | 2.95 | 4.79 | 3.88 | 2.77 | 2.55 | 2.78 |
| 2 | 2.55 | 7.03 | 2.91 | 2.60 | 2.58 | 2.81 | 2.39 | 2.27 | 2.11 |
| 3 | 2.98 | 2.07 | 7.95 | 2.00 | 2.83 | 2.32 | 4.64 | 2.40 | 2.19 |
| 4 | 2.11 | 1.65 | 2.46 | 5.39 | 2.64 | 2.02 | 2.22 | 1.91 | 2.36 |
| 5 | 2.72 | 2.14 | 1.84 | 2.07 | 5.58 | 3.93 | 2.51 | 2.59 | 3.20 |
| 6 | 4.84 | 2.49 | 2.21 | 2.81 | 4.98 | 8.76 | 2.50 | 3.01 | 3.38 |
| 7 | 2.01 | 1.82 | 3.08 | 1.94 | 2.19 | 1.79 | 5.83 | 2.30 | 2.02 |
| 8 | 2.41 | 2.36 | 2.25 | 2.44 | 3.06 | 2.72 | 2.76 | 6.34 | 2.00 |
| 9 | 2.35 | 1.64 | 2.08 | 2.24 | 3.51 | 2.57 | 2.07 | 2.12 | 6.98 |

In another example, a standard B-mode ultrasound image of a phantom is used to test the FIT under noisy conditions. The phantom contains gelatin impregnated with carbon particles simulating tissue echo texture. Two spherical anechoic areas are cross-sectioned and clearly show up as two generally circular targets with similar but distinctly different size and shape. A manual tracing was performed around the left target, and a FIT with a blur radius of 2 pixels performed on the entire image. The FIT contains a tight cluster, or fovea, on the left which results from the target on the left, the target that was manually traced. After the FIT has been scaled and offset between 0 and 255, the fovea on the left has a maximum pixel value of 255. A less compact fovea results from the similar target on the right, having a maximum pixel value of 219. Elsewhere in the image the maximum pixel value is 202.

Figure 11A:
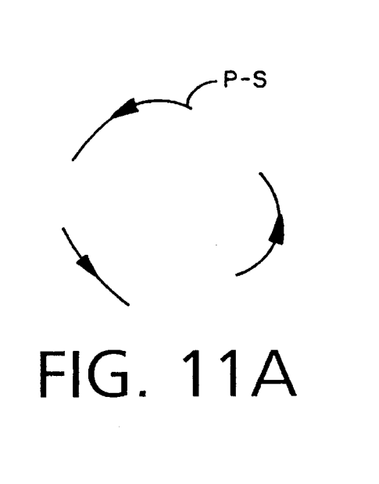
FIG. 11A is an illustration of a discontinuous path.

A path that is segmented, as shown in FIG. 11A, may be derived from a contour that is continuous or noncontinuous. These segments comprise the sharpest or most likely sections of an expected target's boundary. In processing, the integration is carried out by proceeding from segment to adjacent segment around the segments of the path and the accumulated FIT is shifted without further addition or subtraction of the flow while jumping from the end of one segment to the beginning of the next. The overall speed of the transform is improved.

Figure 11B:
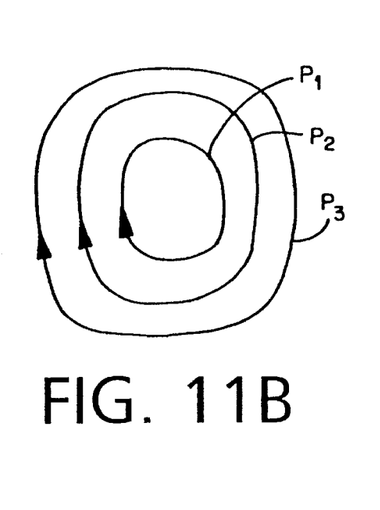
FIG. 11B illustrates concentric circle paths.

The multiple paths of FIG. 11B comprised of a group of concentric circles is another embodiment of the invention. This yields a spectrum which is insensitive to rotation.

Figure 11C:
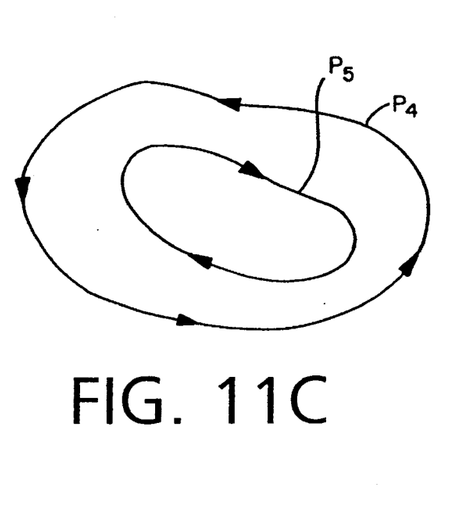
FIG. 11C is an illustration of a path for a hollow shape.

The FIG. 11C embodiment is a form of a non-continuous path. The path represents the contour of a hollow object, or in the case of a 3-D surface, a slice through which the surface pouches out. The inside path P5 is traversed in the opposite direction to the outside path P4 because the inside path is for white pixels.

Figure 12A:
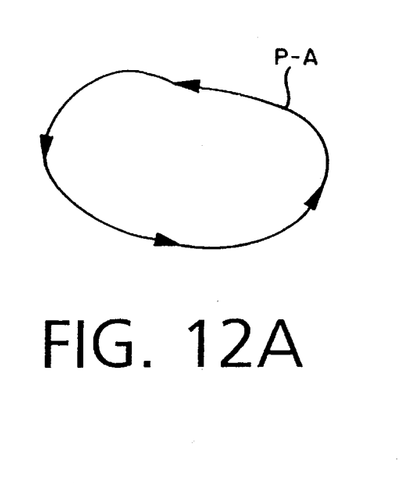
FIGS. 12A, B and C illustrate the adaption of a path.
Figure 12B:
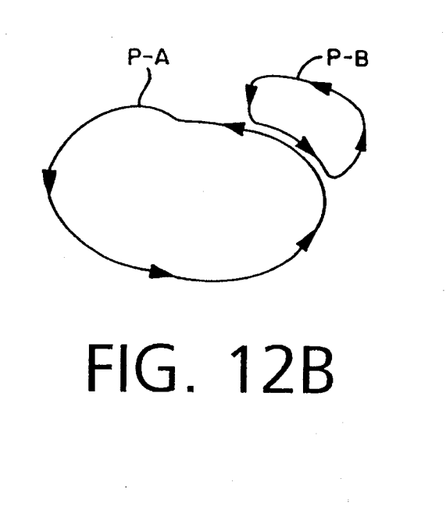
Figure 12C:
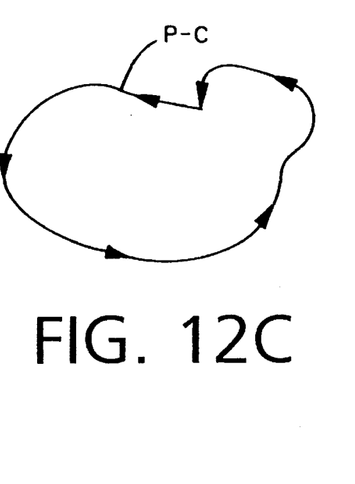

Adaptation of the path can be effected in several ways. Adaptation of the path may be simply a method of searching for a path, or it may include monitoring the progress of the transform, or the final FIT. Adaptation may include iterative feedback techniques to dynamically change the shape, size or orientation of the contour. FIGS. 12A, B, C are illustrative of one technique where the adaptation of a path A into path C is executed by the addition of path B. A contiguous section of path A and path B is shown in the middle of the figure. Assuming the FIT of path A has already been calculated, the FIT of path C can be produced by adding the FIT of path B to the FIT of path A displaced by the vectoral difference between the origins of path A and path B. This is because the contiguous sections of path A and path B run in opposite directions and thus cancel each other in their contributions to the combined FIT. This shortcut reduces the time required to make a path adapt especially if the changes are relatively small compared to the original path. It should also be noted that path B may lie inside as well outside path A, thereby allowing path A to evolve into a smaller as well as a larger path. In this case the paths will be traversed in opposite directions.

Extension of the FIT to three dimensions is realized in the following manner. A stack of paths, each in the x and y plane, but each at a different level in the z dimension is provided. The origin of each path is fixed relative to the origins of the other paths, in the x and y dimensions. This stack of paths can then represent a 3-D expected shape.

The process of performing a 3-D FIT on a 3-D data set using this stack of paths, is as follows. Starting with the top path in the stack, a 2-D FIT is performed on every x-y slice in the 3-D data set, producing a set of slices each of which is the FIT of a different slice of the data set, but with the same path. These FIT slices are combined into a volume and shifted down one slice. The process is then repeated using the second path in the stack and the results accumulated in the stack of FIT slices. A successful detection would be reflected by a collection of voxels in a volumetric fovea. The measurement of cardiac chamber volume using matrix array 3-D ultrasound in the production of a volumetricardiogram is accomplished by adaptation of the FIT.

As will be appreciated, the FIT can be applied to images with vectoral pixels, such as RGB images (Red-Green-Blue). In the most straightforward approach, the FIT would be performed with the same expected shape on each of the component images exactly as it was on a gray-scale image. A separate resulting FIT is stored for each component in the image. Alternatively, different paths are used for each component and/or the resulting FITs are mathematically combined to produce a single scalar output. Construction of variations of the FIT itself, for example, combining multiple input images at the actual time of integration is another approach. For example, where three sets of gradients are used (RGB), then the combination of the three would be integrated such as the maximum of the three at each point in the path.

Other variations, modifications and additions as would be understood by those of skill in the art include integrating a function of the flow such as flow-squared, and a search to find a path beginning with a straight line with feedback from the accumulating FIT to be used as a guide for directing the path and weighting the path.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer process of detecting the presence of a contour in an image formed on an array of pixels comprising:

calculating the x and y gradients Gx and Gy at each pixel in the array, generating a plurality of paths each corresponding in shape to the shape of said contour and fixing a single predetermined point in each path at a pixel in said array, each path being fixed at a different pixel, for each path, proceeding from the pixel at said predetermined point on the path to the next pixel on the path, accumulating in an accumulator the gradient at the next pixel by adding or subtracting the horizontal gradient Gx where the movement to the next pixel was up or down, respectively, or subtracting or adding the vertical gradient Gy where the movement along the path to the next pixel was to the right or left, respectively, then proceeding to the next pixel on said path in said selected direction, accumulating in the accumulator as in said preceding step, and continuing the procedure until said path is traced to the pixel at said predetermined point, whereat the accumulated value in the accumulator for each pixel at said predetermined point is the pixel value for a pixel in a transformed image, and the transformed image indicates the detection of the contour by exhibiting a fovea.

2. A method of computer image processing comprising;

(a) calculating in a processing unit the gradient vectors for each pixel in an image, (b) selecting an arbitrary path delimiting a group of pixels, (c) locating a point on the path on a selected pixel and starting at the selected pixel on said path traversing the path and accumulating in an accumulator the dot products of gradient vectors rotated 90 degrees and the local tangent vector to the path at each pixel along the path, and (d) upon arriving at the selected starting pixel on said path providing in an output image at a pixel thereof, corresponding in location to that of said selected starting pixel, a value corresponding to the value of the accumulated dot products.

3. A method of claim 2 wherein said path is discontinuous.

4. A method of claim 1 including the steps of replicating said path and applying a replicated path, one to each pixel of the image as a selected starting pixel of a path.

5. A method of claim 4 including exhibiting the output image on a display, which image contains a fovea where there is a contour of an object in the image being processed that corresponds in shape to the shape of the arbitrary path.

6. A method of claim 4 further comprising exhibiting the output image on a display wherein the image has a characteristic signature when there is a contour in the image being processed corresponding to the configuration of the path.

7. A method of claim 4 further including modifying the path shape at an interface input of the computer.

8. A method of claim 1 wherein said gradient vector is rotated 90 degrees counterclockwise and the traversing of said path is in a clockwise direction around the path.

9. A method of claim 1 including inputting at an interactive interface plural paths of different sizes and shapes.

10. A computer method of transforming a pixel image into an image indicating the presence of an object of a predetermined shape in the pixel image comprising:

in a processor, determining gradient vectors for each pixel of the pixel image and rotating said vectors 90 degrees, performing at each pixel along a path provided to correspond in shape to the predetermined shape a line integration of the rotated gradient vector and the local tangent vector to the path, providing the result of the line integration as the gray scale value of the last pixel on the path to a correspondingly located pixel in a transformed image, performing the line integration along a plurality of provided paths and providing the result as the gray scale value to a correspondingly located pixel in the transformed image, and exhibiting on a display unit the transformed image.

11. A method of processing an image as in claim 10 further comprising the step of applying a stack of paths to the image in a direction orthogonal to that of the plane of the pixel image.

12. A method of processing an image as in claim 10 wherein said image is a color or other vectoral image comprising:

performing the line integration on each component of the color or other vectoral image.

13. Apparatus comprising:

a pixel array with a digitized image, a parallel pipe system including a processing unit coupled to said pixel array for processing said digitized image, said processing unit including means for determining the gradient for each pixel in the array, means for inputting an arbitrary path into the processing unit, said processing unit generating a plurality of paths from said input path and applying them to said pixel array with each pixel serving as a starting point for one of the paths, said processing unit including means for causing a traversal of said paths in parallel and accumulating in an accumulator the dot products of the gradient rotated 90 degrees and a local tangent vector at each said pixel along each path, and means for applying the accumulated dot product values for each path to the pixel at said starting point of each path to create a transformed array image.

14. The apparatus of claim 13 further comprising means for filtering the accumulated dot products to produce a locus of pixels in the transformed array image exhibiting a maximum intensity value.

15. The apparatus of claim 13 wherein means are provided to shift the accumulation at said accumulator from pixel to pixel along said path.

16. Apparatus for processing an image comprising:

an input for receiving image pixel data, a random access memory connected to said input for storing the image pixel data, a calculator for calculating pixel gradients from said stored image pixel data, a further memory connected to said input for receiving and storing path information, an accumulator, quadrature logic and adding/subtracting operators for rotating and accumulating in said accumulator the gradients in accordance with path information stored in said further memory, and an output for outputting data from the accumulator as transformed image pixel data.

17. Apparatus for processing an image as in claim 16 and further including a shifter for shifting the accumulated gradients from pixel to pixel along a path in accordance with the path information.

18. Apparatus for processing an image as in claim 17 and further including a filter for filtering the accumulated gradient values and outputting them as the transformed image pixel data.

19. A system for detecting the presence of an expected contour in an image comprising, a display screen including a pixel array upon which said image is exhibited, a processor for receiving pixel data from said pixel array and including means for calculating from the pixel data and rotating 90 degrees gradient vectors for each pixel, means for defining a plurality of paths, each corresponding in form to a contour expected to be present in the image and having one predefined point thereon fixed to each pixel of the array, an accumulator for accumulating said gradient at each pixel present on a selected path by adding or subtracting the horizontal gradient upon movement along the path from one pixel to the next in the up or down direction, respectively or subtracting or adding the vertical gradient upon movement along the path from one pixel to the next in the right or left direction, respectively, and means for outputting from said accumulator transformed image data indicating the detection of the presence of the expected contour.

20. A system of claim 19 further comprising means for changing the pixel intensity value at said one predefined point in accordance with the value accumulated in said accumulator.

21. A system of claim 19 further comprising means for adapting the paths to modify the form of the paths for changing the shape of the expected contour.

22. A system of claim 19 further comprising a display device for receiving the transformed image data and displaying the image data as a transformed image indicating the detection or absence of the expected contour.

23. A method of computer processing image data representing gray scale values for the individual pixels of an image display into transform image data representing gray scale values for the individual pixels in a transform image display comprising;

determining gradient vectors for each pixel from the image data, inputting into the computer at an interactive interface a signal representing an arbitrary path delimiting a group of pixels of the image display, specifying a starting point on said path and locating the starting point on a selected pixel of the image display, traversing said path beginning at said starting point and at each pixel that is on said path accumulating in an accumulator the dot products of the gradient vector rotated 90 degrees and the local tangent vector to the path at that pixel, and upon completion of the traversing of the path and arriving at said starting point, outputting the accumulated dot product in the accumulator as transform image pixel data.

24. A device for processing an image on a pixel display comprising, a processor, said processor including means for determining the gradient vector for each pixel of the display and means for rotating the gradient vectors 90 degrees to form flow vectors, an interface for inputting to the processor a path corresponding in shape to that of an object expected to be present in the image, said processor further including means for replicating the path to form a plurality of paths, locating each of the plurality of paths on a respective pixel of the display, and forming tangent vectors to the path at each pixel on the path, said processor additionally including means for traversing each path and at each pixel on that path forming the dot product of the flow vector and tangent vector and accumulating the dot products in an accumulator, and means for outputting the accumulated dot product from the accumulator at said respective pixel as image data for a correspondingly located pixel in a transform image display.

25. In a computer-implemented method for detecting the presence and location of a contour in a gray scale digitized image comprising, storing in a memory of a computer gray scale digitized data for each pixel of an image, inputting to the computer at an interactive interface signals representing a path corresponding to a contour expected to be present in said image, locating said path on the image such that the origin of the path is placed on a pixel of the image, determining a gradient vector for each pixel in said digitized image from the stored gray scale digitized data and a tangent vector for each pixel of the image that is on said path, traversing said path and calculating the dot product of the gradient vector rotated 90 degrees and the tangent vector to the path at each pixel on said path and accumulating the dot product in an accumulator, and outputting from said accumulator the accumulated dot product as gray scale digitized data for the pixel value of a pixel in a transform image.

26. A process for testing for the presence of a contour in an image on an image display comprising, inputting into a processor pixel data representing the image on the display, inputting into the processor a path corresponding in shape to the contour for which the presence is being tested, producing replicas of said path in said processor, filtering and searching said pixel data by applying a flow integration transform to the pixel data of the pixels located on each path replica to produce transform image pixel data, and exhibiting on a display a transform image in accordance with the transform image pixel data whereby the transform image is indicative of the presence of the contour in the image.

* * * * *